(12) United States Patent
Lanzatella et al.

(10) Patent No.: US 8,874,628 B1
(45) Date of Patent: Oct. 28, 2014

(54) SYSTEMS AND METHODS FOR PROJECTING HIERARCHICAL STORAGE MANAGEMENT FUNCTIONS

(75) Inventors: Thomas Lanzatella, Minneapolis, MN (US); Laxmikant Gunda, Pune (IN); Richard Jones, Bershire (GB)

(73) Assignee: Symantec Corporation, Mountain View, CA (US)

( * ) Notice: Subject to any disclaimer, the term of this patent is extended or adjusted under 35 U.S.C. 154(b) by 611 days.

(21) Appl. No.: 12/579,526

(22) Filed: Oct. 15, 2009

(51) Int. Cl.
| | |
|---|---|
| *G06F 17/00* | (2006.01) |
| *G06F 17/30* | (2006.01) |
| *G06F 15/16* | (2006.01) |
| *G06F 13/00* | (2006.01) |
| *G06F 11/00* | (2006.01) |
| *G06F 11/16* | (2006.01) |

(52) U.S. Cl.
CPC .............. *G06F 17/00* (2013.01); *G06F 17/30* (2013.01)
USPC ........... 707/829; 707/651; 707/665; 707/694; 707/821; 707/827; 709/203; 709/206; 711/117; 711/161; 714/6.13; 714/6.22

(58) Field of Classification Search
CPC ......... G06F 17/00; G06F 17/30; G06F 15/16; G06F 11/00; G06F 11/16; G06F 13/00
USPC ......... 707/694–696, 822–823, 827–829, 831, 707/609, 651, 665, 786, 792, 805, 821; 715/779, 209; 709/203, 206, 220–225; 711/117, 118, 161–162; 714/6.13, 714/6.21–6.22
See application file for complete search history.

(56) References Cited

U.S. PATENT DOCUMENTS

| | | | | | |
|---|---|---|---|---|---|
| 5,564,037 | A | * | 10/1996 | Lam .............................. | 711/161 |
| 5,687,390 | A | * | 11/1997 | McMillan, Jr. .................. | 710/5 |
| 5,784,646 | A | * | 7/1998 | Sawada .......................... | 710/38 |
| 5,960,169 | A | * | 9/1999 | Styczinski .................. | 714/6.12 |
| 5,991,753 | A | * | 11/1999 | Wilde ..................................... | 1/1 |
| 6,023,709 | A | * | 2/2000 | Anglin et al. ......................... | 1/1 |
| 6,269,382 | B1 | * | 7/2001 | Cabrera et al. ...................... | 1/1 |
| 6,330,572 | B1 | * | 12/2001 | Sitka ............................. | 707/608 |
| 6,718,372 | B1 | * | 4/2004 | Bober .......................... | 709/217 |
| 6,854,035 | B2 | * | 2/2005 | Dunham et al. .............. | 711/117 |
| 7,546,324 | B2 | * | 6/2009 | Prahlad et al. ........................ | 1/1 |
| 7,610,285 | B1 | * | 10/2009 | Zoellner et al. ...................... | 1/1 |
| 7,617,292 | B2 | * | 11/2009 | Moore et al. .................. | 709/216 |
| 7,685,183 | B2 | * | 3/2010 | Pace et al. .................... | 707/610 |
| 7,693,877 | B1 | * | 4/2010 | Zasman ........................ | 707/707 |

(Continued)

FOREIGN PATENT DOCUMENTS

| | | | |
|---|---|---|---|
| EP | 0385655 | * | 9/1990 |
| EP | 1 865 424 | * | 12/2007 |

(Continued)

*Primary Examiner* — Srirama Channavajjala
(74) *Attorney, Agent, or Firm* — ALG Intellectual Property, LLC

(57) ABSTRACT

A computer-implemented method for projecting hierarchical storage management functions may include enumerating objects stored on an endpoint system via an agent on the endpoint system. The computer-implemented method may also include transmitting, via a web service, information relating to the enumeration to a server. The computer-implemented method may further include receiving, via the web service, a hierarchical storage management policy from the server. The computer-implemented method may additionally include enacting the hierarchical storage management policy via the agent. Various other methods and systems are also disclosed.

20 Claims, 6 Drawing Sheets

(56) References Cited

U.S. PATENT DOCUMENTS

| | | | |
|---|---|---|---|
| 7,734,593 B2 * | 6/2010 | Prahlad et al. | 707/640 |
| 2001/0001871 A1 * | 5/2001 | Shrader et al. | 711/114 |
| 2003/0101189 A1 * | 5/2003 | Lanzatella et al. | 707/100 |
| 2003/0154404 A1 * | 8/2003 | Beadles et al. | 713/201 |
| 2004/0088382 A1 * | 5/2004 | Therrien et al. | 709/219 |
| 2005/0071560 A1 * | 3/2005 | Bolik | 711/117 |
| 2005/0210291 A1 * | 9/2005 | Miyawaki et al. | 713/201 |
| 2005/0216532 A1 * | 9/2005 | Lallier | 707/204 |
| 2006/0015529 A1 * | 1/2006 | Yagawa | 707/104.1 |
| 2007/0130232 A1 * | 6/2007 | Therrien et al. | 707/204 |
| 2007/0185937 A1 * | 8/2007 | Prahlad et al. | 707/204 |
| 2007/0198612 A1 * | 8/2007 | Prahlad et al. | 707/204 |
| 2009/0300079 A1 * | 12/2009 | Shitomi | 707/204 |

FOREIGN PATENT DOCUMENTS

| | | | |
|---|---|---|---|
| WO | WO 00/04483 | * | 1/2000 |
| WO | WO 0045303 | * | 8/2000 |
| WO | WO 2011/108021 | * | 9/2011 |

* cited by examiner

SYSTEMS AND METHODS FOR PROJECTING HIERARCHICAL STORAGE MANAGEMENT FUNCTIONS

BACKGROUND

Organizations with high volumes of data have long sought to maximize data storage performance while minimizing the cost of storage. Unfortunately, the goals of high performance and low cost are often at odds. Traditionally, many organizations have turned to hierarchical storage management ("HSM") systems in order to achieve relatively high-performance storage at a relatively low cost. HSM solutions typically automatically place data that is frequently accessed on high-performance, high-cost storage, while placing data that is infrequently accessed on low-performance, low-cost storage.

HSM solutions, however, are currently deployed in an increasingly fragmented market. For example, while HSM solutions were once predominately implemented on UNIX systems, today HSM solutions are often implemented on MICROSOFT WINDOWS systems. Unfortunately, differing platforms such as these may lack the native ability to interoperate in ways necessary for hierarchical storage management systems. For example, a MICROSOFT WINDOWS server that relies on Common Internet File System ("CIFS") technology to inspect, access, and manipulate files across a network may be unable to properly apply hierarchical storage management techniques on a UNIX endpoint system that lacks CIFS functionality. Accordingly, the instant disclosure identifies and addresses a need for systems and methods that project hierarchical storage management functions across different platforms.

SUMMARY

The instant disclosure generally relates to systems and methods for projecting hierarchical storage management functions. As will be described in greater detail below, embodiments of the instant disclosure may increase the flexibility of hierarchical storage management architectures by enabling diverse platforms to interoperate through common protocols when performing hierarchical storage management functions. In one example, an exemplary client-side method for accomplishing this task may include: 1) enumerating, via an agent on an endpoint system, objects stored on the endpoint system, 2) transmitting information relating to the enumeration to a server via a web service, 3) receiving a hierarchical storage management policy from the server via the web service, and then 4) enacting, via the agent, the hierarchical storage management policy on the endpoint system.

In some examples, enumerating the objects stored on the endpoint system may include creating a list of the objects stored on the endpoint system and/or gathering metadata related to the objects stored on the endpoint system. In these examples, gathering metadata related to the objects stored on the endpoint system may include gathering: 1) sizes of the objects, 2) creation times of the objects, 3) most recent read times of the objects, 4) most recent write times of the objects, 5) permissions associated with the objects, 6) ownerships of the objects, 7) the number of links to the objects, 8) regular attributes of the objects, 9) extended attributes of the objects, and/or 10) forks of the objects.

In some embodiments, enumerating the objects stored on the endpoint system may include classifying the objects and/or ranking the objects. In this example, ranking the objects may include: 1) prioritizing the objects for migration to a repository, 2) prioritizing the objects that are to be maintained on the endpoint system, and/or 3) prioritizing the objects for recovery after a failure on the endpoint system.

In certain examples, enacting the hierarchical storage management policy may include migrating at least one file from the endpoint system to a repository and/or restoring at least one file from the repository to the endpoint system. In these examples, migrating the file from the endpoint system may include creating a stub for the file via the agent on the endpoint system. According to some embodiments, the web service may transmit messages via HTTP. In at least one embodiment, the systems and methods disclosed herein may also expose to the server, via the agent, an HTTP browser interface for selecting objects stored on the endpoint system.

Similarly, an exemplary server-side method for projecting hierarchical storage management functions may include: 1) identifying an endpoint system of a hierarchical storage management system, 2) receiving, via a web service, an enumeration of objects stored on the endpoint system, and then 3) transmitting, via the web service, a hierarchical storage management policy to the endpoint system.

In some embodiments, the enumeration of objects from the endpoint system may include a list of the objects stored on the endpoint system and/or metadata related to the objects stored on the endpoint system. In these examples, receiving metadata related to the objects may include receiving: 1) sizes of the objects, 2) creation times of the objects, 3) most recent read times of the objects, 4) most recent write times of the objects, 5) permissions associated with the objects, 6) ownerships of the objects, 7) the numbers of links to the objects, 8) regular attributes of the objects, 9) extended attributes of the objects, and/or 10) forks of the objects.

In some examples, receiving the enumeration of objects from the endpoint system may include receiving a classification of the objects and/or a ranking of the objects. In these examples, receiving the ranking of the objects may include receiving: 1) a prioritization for migrating the objects to a repository, 2) a prioritization for maintaining the objects on the endpoint system, and/or 3) a prioritization for recovering the objects after a failure on the endpoint system.

In some embodiments, the web service may transmit messages via HTTP. In these examples, the server may select objects stored on the endpoint system via an HTTP browser interface. In addition, the server may migrate at least one file from the endpoint system to a repository and/or restore at least one file from the repository to the endpoint system.

As will be explained below, by utilizing an agent on an endpoint system to perform hierarchical storage management functions (such as object enumeration and hierarchical-storage-management-policy enactment) and by transmitting information pertaining to hierarchical storage management tasks via a web service, the systems and methods described herein may enable hierarchical storage management systems to include endpoints that would otherwise be incompatible with conventional hierarchical storage management servers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
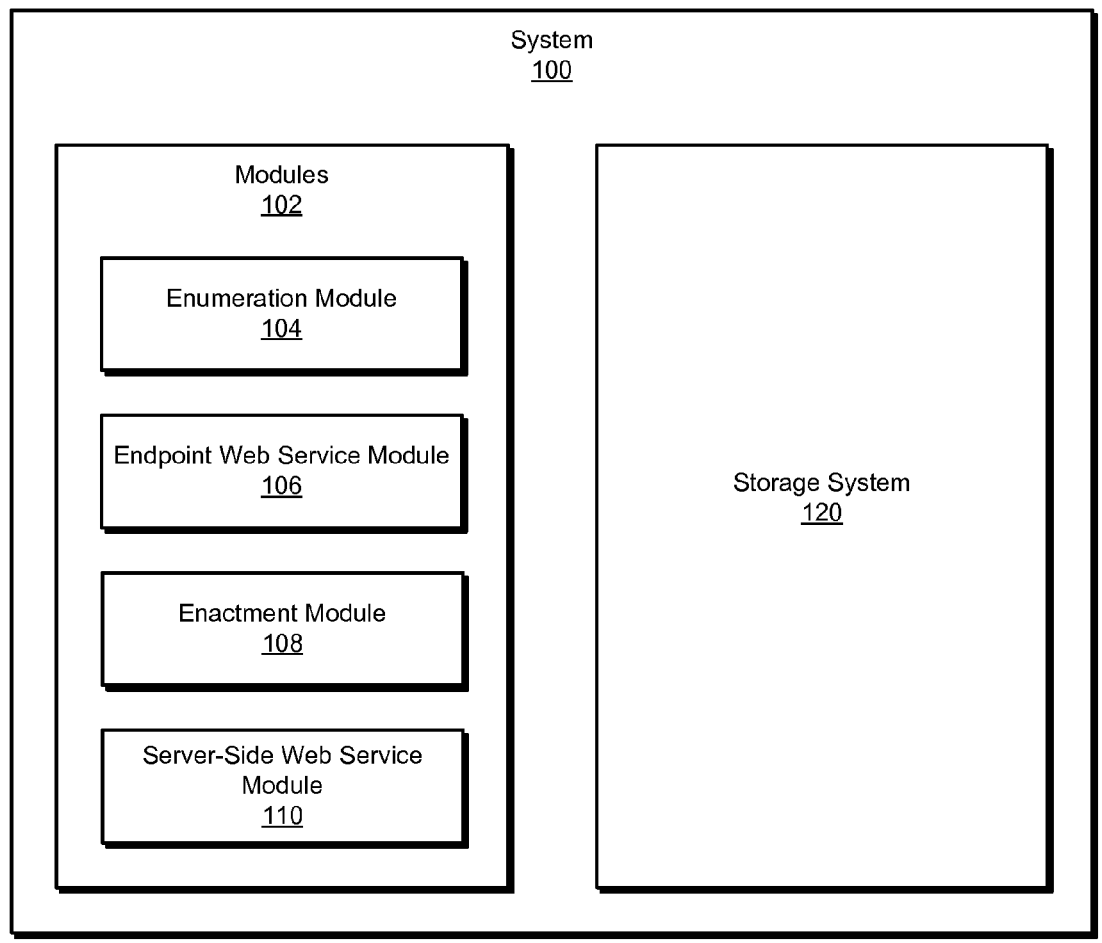
FIG. 1 is a block diagram of an exemplary system for projecting hierarchical storage management functions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for projecting hierarchical storage management functions. In one example, the various systems described herein may accomplish this task by: 1) enumerating, via an agent on an endpoint system, objects stored on the endpoint system, 2) transmitting information relating to this enumeration to a server via a web service, 3) receiving a hierarchical storage management policy from the server via the web service, and then 4) enacting, via the agent, the hierarchical storage management policy on the endpoint system.

As will be explained below, by utilizing an agent on an endpoint system to perform hierarchical storage management functions (such as object enumeration and hierarchical-storage-management-policy enactment) and by transmitting information pertaining to hierarchical storage management tasks via a web service, the systems and methods described herein may enable hierarchical storage management systems to include endpoints that would otherwise be incompatible with conventional hierarchical storage management servers.

Figure 2:
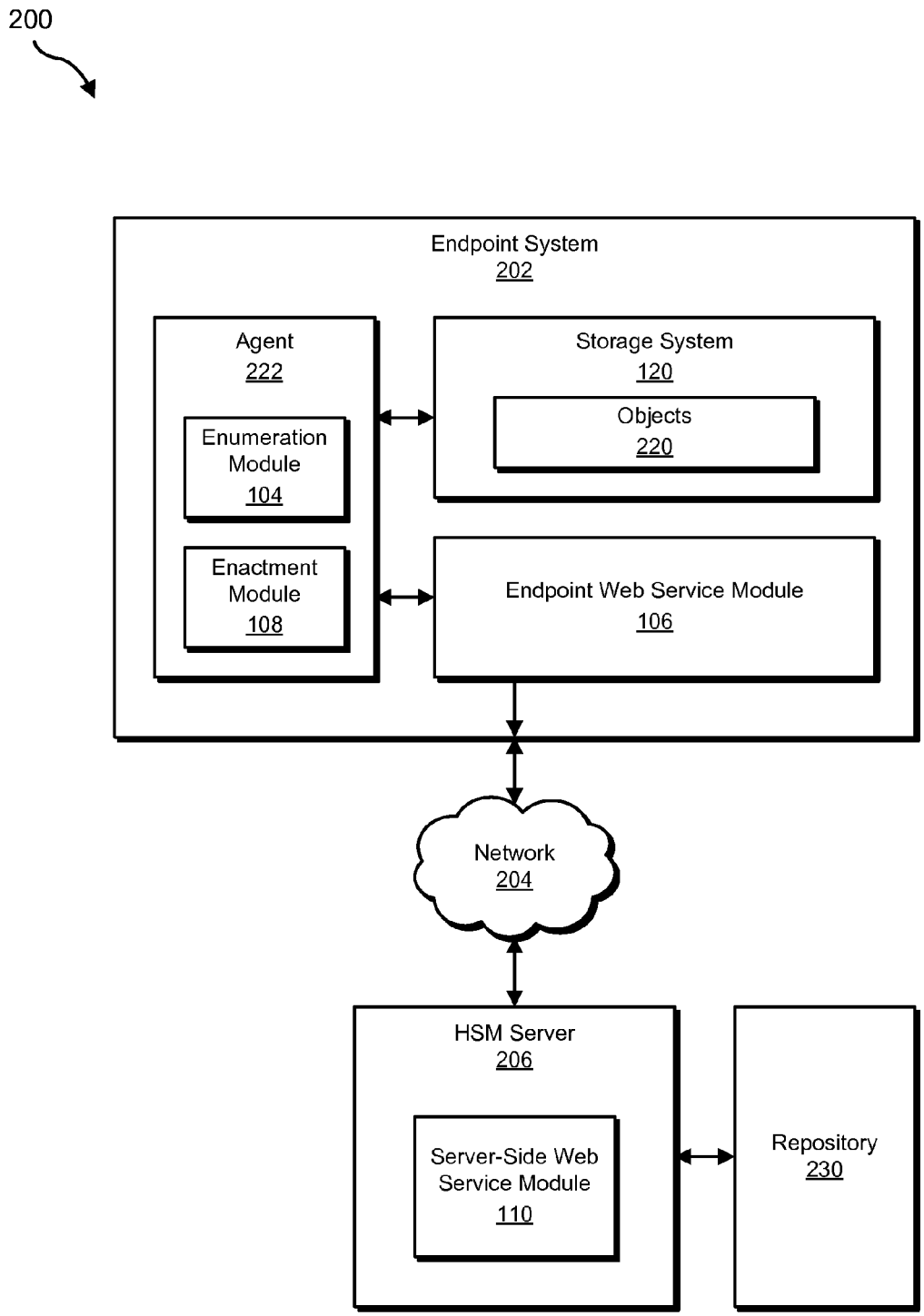
FIG. 2 is a block diagram of an exemplary system for projecting hierarchical storage management functions.

The following will provide, with reference to FIGS. 1-2, detailed descriptions of exemplary systems for projecting hierarchical storage management functions. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for projecting hierarchical storage management functions. As illustrated in this figure, exemplary system 100 may include one or more modules 102 for performing one or more tasks. For example, and as will be explained in greater detail below, exemplary system 100 may include an enumeration module 104 programmed to enumerate objects stored on an endpoint system via an agent on the endpoint system. Exemplary system 100 may also include an endpoint web service module 106 programmed to: 1) transmit, via a web service, information relating to the enumeration to a server and 2) receive, via the web service, a hierarchical storage management policy from the server.

In addition, and as will be described in greater detail below, exemplary system 100 may include an enactment module 108 programmed to enact the hierarchical storage management policy via the agent. Exemplary system 100 may also include a server-side web service module 110 programmed to: 1) identify an endpoint system of a hierarchical storage management system, 2) receive, via a web service, an enumeration of objects stored on the endpoint system, and 3) transmit, via the web service, a hierarchical storage management policy to the endpoint system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., endpoint system 202 and/or HSM server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a storage system 120. Storage system 120 may represent a portion of one or more storage devices. For example, storage system 120 may represent a storage system on endpoint system 202 in FIG. 2, primary storage device 532 and/or backup storage device 533 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or any other remote interface. Various functions described herein may be provided through a remote desktop environment or any other cloud-based computing environment.

As shown in FIG. 2, system 200 may include an endpoint system 202 in communication with an HSM server 206 via a network 204. In one embodiment, and as will be described in greater detail below, endpoint system 202 may be programmed to enact various hierarchical storage management policies received from HSM server 206.

For example, endpoint system 202 may be programmed with enumeration module 104, endpoint web service module 106, and enactment module 108 from FIG. 1. In this example, and as will be described in greater detail below, enumeration module 104 may, as part of an agent 222 on endpoint system 202, enumerate objects 220 stored on storage system 120. Endpoint web service module 106 may then transmit information relating to these enumerated objects across network 204 to HSM server 206 through a web service. Server-side web service module 110 on HSM server 206 may then receive this information (e.g., the enumeration of objects 220) through a web service.

Server-side web service module 110 on HSM server 206 may then transmit, via a web service, a hierarchical storage management policy to endpoint system 202 (which may receive the same via endpoint web service module 106). Enactment module 108 on endpoint system 202 may then, as part of agent 222, enact the hierarchical storage management policy received from HSM server 206. For example, enactment module 108 may migrate some of objects 220 to a repository 230.

Endpoint system 202 generally represents any type or form of computing device capable of reading computer-executable instructions. Examples of endpoint system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device. As used herein, the phrase "endpoint system" may refer to a single computing device or a collection of computing devices. In some examples, an "endpoint system" may include an end-user device, a server, and/or a proxy.

HSM server 206 generally represents any type or form of computing device that is capable of providing hierarchical storage management functions. Examples of HSM server 206 include, without limitation, application servers configured to run certain software applications and/or specialized devices configured to provide HSM functionality within an HSM architecture.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between endpoint system 202 and HSM server 206.

Figure 3:
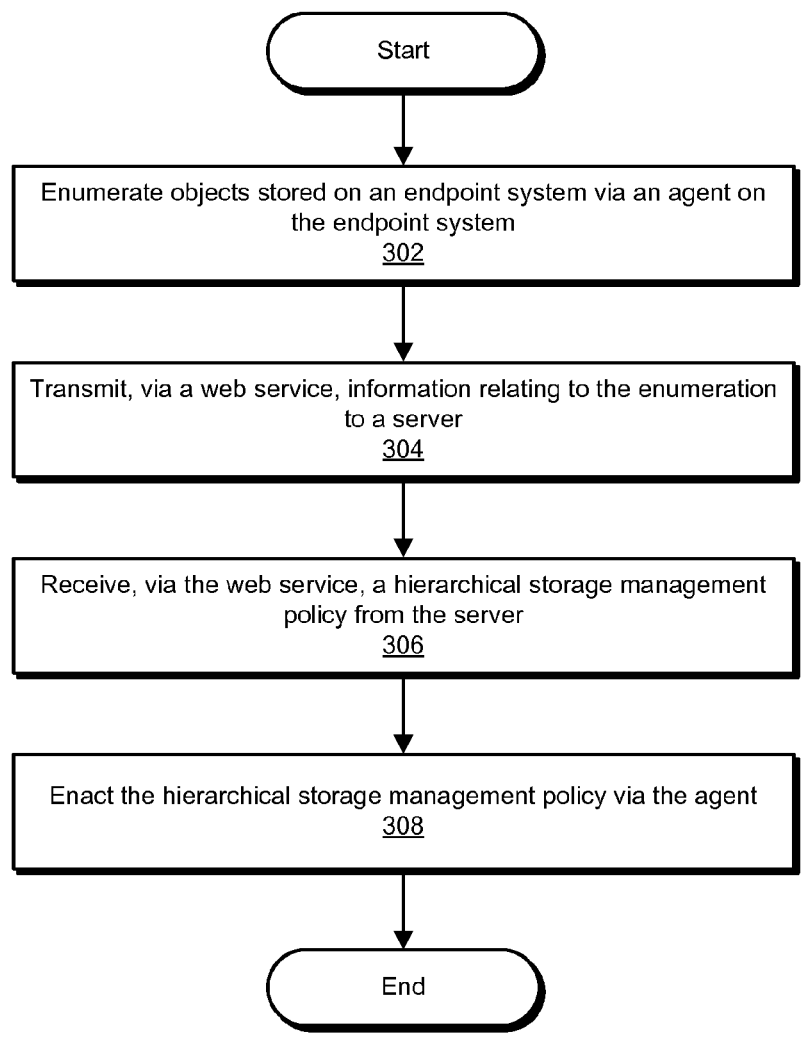
FIG. 3 is a flow diagram of an exemplary method for projecting hierarchical storage management functions.

FIG. 3 is a flow diagram of an exemplary client-side method 300 for projecting hierarchical storage management functions. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may enumerate objects stored on an endpoint system via an agent on the endpoint system. For example, enumeration module 104 in FIG. 1 may, as part of agent 222 on endpoint system 202 in FIG. 2, enumerate objects 220 stored on endpoint system 202.

As used herein, the term "objects" may refer to files, volumes, or any other collections of data subject to a hierarchical storage management policy. In addition, the term "agent" may refer to any collection of modules, software, and/or executable code that may be programmed and/or configured to facilitate hierarchical storage management. In various embodiments, an "agent" may run in a variety of protection rings. For example, some portions of an agent may run in a kernel mode (e.g., as part of a file system driver). In another example, some portions of an agent may run in a user mode.

Enumeration module 104 may perform a variety of tasks as part of enumerating objects stored on an endpoint system in step 302. For example, enumeration module 104 may, as part of enumerating objects stored on an endpoint system: 1) count, catalogue, and/or list the objects, 2) gather information about the objects, and/or 3) generate information about the objects.

For example, enumeration module 104 may enumerate the objects stored on the endpoint system by creating a list of the objects stored on the endpoint system. As used herein, the term "list" may refer to a list, set, and/or collection of data items in any suitable data structure. Enumeration module 104 may create the list of objects stored on the endpoint system in any suitable manner. For example, enumeration module 104 may execute a command that lists objects stored in a file system. Additionally or alternatively, enumeration module 104 may monitor changes to objects in a file system (e.g., enumeration module 104 may include portions of a file system driver through which all changes to objects in a file system may pass).

Enumeration module 104 may also enumerate the objects stored on the endpoint system by gathering metadata related to the objects stored on the endpoint system. For example, enumeration module 104 may gather information indicating or relating to the sizes of the objects, the creation times of the objects, the most recent read times of the objects, the most recent write times of the objects, permissions associated with the objects (e.g., permissions to read, write to, and/or access the objects), ownerships of the objects (e.g., individual ownerships and/or group ownerships), and/or the number of links to the objects (e.g., symbolic links, hard links, shortcuts and/or references to the objects). Additionally or alternatively, enumeration module 104 may gather information relating to regular attributes of the objects, the extended attributes of the objects, and/or forks (such as data forks, resource forks, and/or alternate data streams) associated with the objects. Generally, enumeration module 104 may gather any information relating to the objects that may be useful for formulating and/or executing hierarchical storage management policies.

Enumeration module 104 may also enumerate the objects stored on the endpoint system by classifying the objects and/or ranking the objects. For example, enumeration module 104 may classify objects according to file type (e.g., multimedia file, text document, executable file, configuration file, etc.), the type of device that the object is currently stored on (e.g., a solid state drive, a hard disk drive, etc.), and/or according to any other classification that may help an HSM system to make efficient decisions. In various embodiments, enumeration module 104 may classify and/or rank the objects based on information and/or metadata gathered relating to the objects.

Enumeration module 104 may rank the objects stored on the endpoint system according to a variety of HSM metrics. For example, enumeration module 104 may rank the objects according to a priority metric for migrating each object to a repository. Additionally or alternatively, enumeration module 104 may rank the objects according to a priority metric for maintaining or keeping each object on the endpoint system. In some cases, enumeration module 104 may rank the objects according to a priority metric for recovering each object from a repository after a failure of the endpoint system (e.g., ranking those objects that are key to getting a vital application on the endpoint system properly running again in the case of a system failure).

Returning to FIG. 3, at step 304 one or more of the systems described herein may transmit, via a web service, information relating to the enumeration performed in step 302 to the server. For example, endpoint web service module 106 in FIG. 1 may, as part of endpoint system 202 in FIG. 2, transmit some or all of the enumeration information generated by enumeration module 104 to HSM server 206.

As used herein, the phrase "web service" may refer to any system supporting and/or facilitating computing system interoperability across a network. In some examples, a "web service" may include a representational state transfer web service or a stateful web service. In one embodiment, a web service may transmit messages using open protocols. For example, a web service may use XML messages that follow the Simple Object Access Protocol ("SOAP"). These messages may be transmitted via HTTP, or any other suitable protocol.

Endpoint web service module 106 may transmit information relating to the enumeration of the objects in any suitable manner. For example, endpoint web service module 106 may format the enumeration information received from enumeration module 104 into a machine-parsable text (such as XML) and insert the XML information in an HTTP message. Generally, endpoint web service module 106 may use any suitable protocols to encode and transmit messages conveying the enumeration information.

According to some embodiments, endpoint web service module 106 may transmit all of the information relating to the enumeration of objects gathered and/or generated by enumeration module 104. In other embodiments, endpoint web service module 106 may transmit only portions of the enumeration information (e.g., endpoint web service module 106 may transmit portions of the information relevant to making HSM policy decisions, but not transmit portions of the information relevant only to enacting HSM policy decisions).

Returning to FIG. 3, at step 306 one or more of the systems described herein may receive, via the web service, a hierarchical storage management policy from the server. For example, endpoint web service module 106 in FIG. 1 may, as part of endpoint system 202, receive a hierarchical storage management policy from HSM server 206.

As used herein, the phrase "hierarchical storage management policy" may refer to any policy, rule, definition, and/or decision-making scheme related to the disposition of stored objects. For example, a hierarchical storage management policy may include storage quotas (e.g., no endpoint system should use more than 90 percent of its local storage space for permanent files), access priorities relating to different file types (e.g., configuration files should always stay on an endpoint system, or media files should migrate before other files of comparable size), the performance requirements of an endpoint system (e.g., whether the endpoint system should tend to migrate files to a repository or tend to keep files), which volumes are available for migration, exceptions for specific files, etc. In some embodiments, a separate hierarchical storage management policy may apply to each volume of a storage system.

According to some embodiments, the hierarchical storage management policy may include explicit hierarchical storage management decisions for the endpoint system to enact (e.g., a list of files to migrate and/or restore). Additionally or alternatively, the hierarchical storage management policy may include broad rules for the endpoint system to apply (migrate all files past a certain staleness-to-size ratio).

Returning to FIG. 3, at step 308 one or more of the systems described herein may enact the hierarchical storage management policy via the agent. For example, enactment module 108 in FIG. 1 may, as part of agent 222 on endpoint system 202, enact the hierarchical storage management policy received from HSM server 206. After completion of step 308, exemplary method 300 in FIG. 3 may terminate.

Enactment module 108 may enact the hierarchical storage management policy by taking a variety of actions. For example, enactment module 108 may enact the hierarchical storage management policy by migrating at least one file from the endpoint system to a repository. In this example, enactment module 108 may refer to metadata gathered by enumeration module 104 (e.g., the last time a file was accessed and the size of the file) and the hierarchical storage management policy received by endpoint web service module 106 (e.g., migrate all files that haven't been accessed within a week and that are larger than one megabyte).

Additionally or alternatively, enactment module 108 may enact the hierarchical storage management policy by restoring at least one file from the repository to the endpoint system. As in the example above, enactment module 108 may draw on the enumeration metadata and/or the hierarchical storage management policy to determine whether the file should be restored (e.g., enactment module 108 may restore the file to the endpoint system based on an HSM policy that specifies that a file accessed twice within the last week and under 50 megabytes should be restored).

Enactment module 108 may perform any related HSM tasks as part of migrating a file from the endpoint system to a repository. For example, enactment module 108 may create a stub for the migrated file. The stub may indicate that the file is currently stored in the repository. In some embodiments, the stub may include a shortcut, a symbolic link, and/or a reparse point. Additionally or alternatively, the agent on the endpoint system (e.g., as part of a file system driver) may intercept attempts to access the stub and retrieve the file from the repository before allowing access to the file. In some embodiments, enactment module 108 may perform such an interception task.

In some embodiments, the systems and methods disclosed herein may expose to the server, via the agent, an HTTP browser interface for selecting objects stored on the endpoint system. For example, endpoint web service module 106 may expose an HTTP browser interface for selecting some of objects 220 on endpoint system 202. In one example, this may allow an administrator creating hierarchical storage management policies for HSM server 206 to access an interface listing some of objects 220. The administrator may then select certain objects (such as volumes) for inclusion or exclusion in the hierarchical storage management system.

Figure 4:
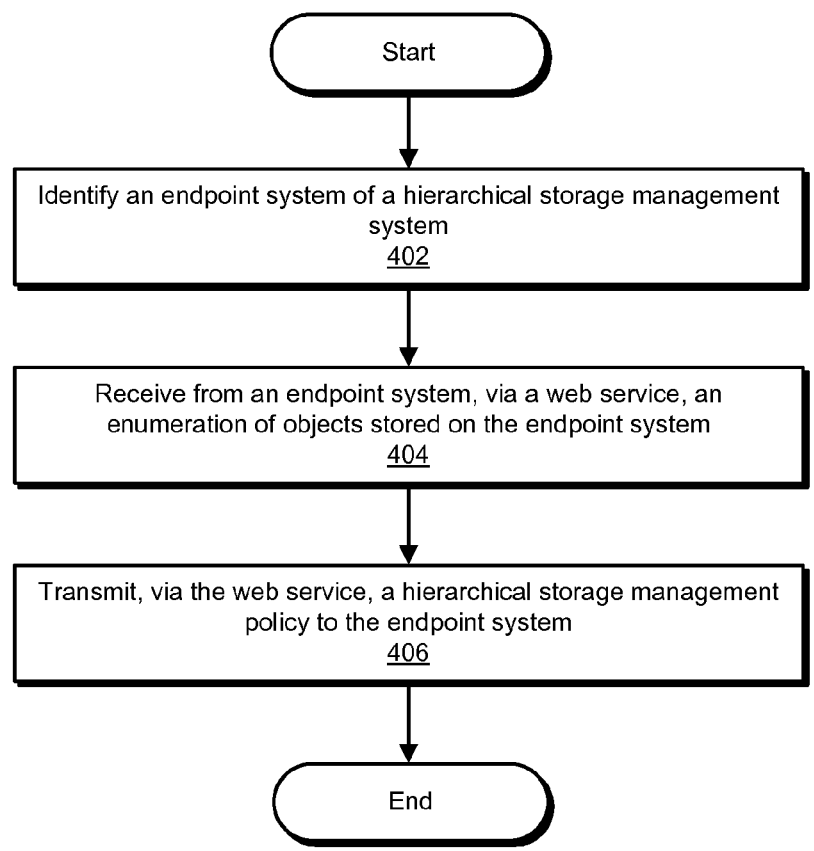
FIG. 4 is a flow diagram of an exemplary method for projecting hierarchical storage management functions.

FIG. 4 is a flow diagram of an exemplary server-side method 400 for projecting hierarchical storage management functions. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may identify an endpoint system of a hierarchical storage management system. For example, server-side web service module 110 in FIG. 1 may, as part of HSM server 206 in FIG. 2, identify endpoint system 202.

Server-side web service module 110 may identify endpoint systems in any suitable manner. For example, server-side web service module 110 may read from a configuration file that identifies and/or indicates the network location of an endpoint system. Additionally or alternatively, server-side web service module 110 may scan a network for an endpoint system. In another example, server-side web service module 110 may simply identify an endpoint system by receiving a communication from the endpoint system.

At step 404, one or more of the systems described herein may receive from the endpoint system, via a web service, an enumeration of objects stored on the endpoint system. For example, server-side web service module 110 in FIG. 1 may, as part of HSM server 206 in FIG. 2, receive an enumeration of objects stored on endpoint system 202.

As detailed above, server-side web service module 110 may receive a variety of information as part of the enumeration of objects. For example, server-side web service module 110 may receive, as part of the enumeration of objects received in step 404: 1) a count, catalogue, and/or list of the objects, 2) metadata associated with the objects, and/or 3) information generated based on the objects.

For example, server-side web service module 110 may receive a list of objects stored on an endpoint system and/or metadata associated with the objects stored on the endpoint system. For example, server-side web service module 110 may receive information indicating or relating to the sizes of the objects, the creation times of the objects, the most recent read times of the objects, the most recent write times of the objects, permissions associated with the objects (e.g., permissions to read, write to, and/or access the objects), ownerships of the objects (e.g., individual ownerships and/or group ownerships), and/or the number of links to the objects (e.g., symbolic links, hard links, shortcuts and/or references to the objects). Additionally or alternatively, server-side web service module 110 may receive information relating to regular attributes of the objects, the extended attributes of the objects, and/or forks (such as data forks, resource forks, and/or alternate data streams) associated with the objects. Generally, server-side web service module 110 may receive any information relating to the objects that may be useful for formulating and/or executing hierarchical storage management policies.

Server-side web service module 110 may also receive an enumeration of objects stored on an endpoint system by receiving a classification of the objects and/or a ranking of the objects. For example, server-side web service module 110 may receive a classification of the objects according to file type (e.g., multimedia file, text document, executable file, configuration file, etc.), the type of device that the object is currently stored on (e.g., a solid state drive, a hard disk drive, etc.), and/or according to any other classification that may help an HSM system make efficient decisions.

As detailed above, the rankings received by server-side web module 110 may be based on a variety of HSM metrics. For example, server-side web service module 110 may receive a ranking of the objects according to a priority metric for migrating each object to a repository. Additionally or alternatively, server-side web service module 110 may receive a ranking of the objects according to a priority metric for maintaining or keeping each object on the endpoint system. In some cases, server-side web service module 110 may receive a ranking of the objects according to a priority metric for recovering each object from a repository after a failure of the endpoint system (e.g., a ranking based on those objects that are key to getting a vital application on the endpoint system properly running again in the case of a system failure).

Returning to FIG. 4, at step 406 one or more of the systems described herein may transmit, via a web service, a hierarchical storage management policy to the endpoint system. For example, server-side web service module 110 in FIG. 1 may, as part of HSM server 206 in FIG. 2, transmit a hierarchical storage management policy to endpoint system 202. Upon completion of step 406, exemplary method 400 in FIG. 4 may terminate.

Server-side web service module 110 may transmit hierarchical storage management policies in any suitable manner. According to some embodiments, the web service may transmit such messages via an open protocol, such as HTTP. For example, server-side web service module 110 may format a hierarchical storage management policy into a machine-parsable text (such as XML) and then insert this XML information in an HTTP message. Generally, server-side web service module 110 may use any suitable protocol to encode and transmit messages conveying hierarchical storage management policies.

Server-side web service module 110 may transmit the hierarchical storage management policy by transmitting any suitable policy, rule, definition, and/or decision-making scheme related to the disposition of stored objects. For example, the hierarchical storage management policy may include storage quotas (e.g., no endpoint system should use more than 90 percent of its local storage space for permanent files), access priorities relating to different file types (e.g., configuration files should always stay on an endpoint system, or media files should migrate before other files of comparable size), the performance requirements of an endpoint system (e.g., whether the endpoint system should tend to migrate files to a repository or tend to keep files), which volumes are available for migration, exceptions for specific files, etc.

According to some embodiments, the hierarchical storage management policy may include explicit hierarchical storage management decisions for the endpoint system to enact (e.g., a list of files to migrate and/or restore). Additionally or alternatively, the hierarchical storage management policy may include broad rules for the endpoint system to apply (migrate all files past a certain staleness-to-size ratio).

According to some embodiments, one or more of the systems described herein may migrate at least one file from the endpoint system to the repository and/or restore at least one file from the repository to the endpoint system. For example, server-side web service module 110 in FIG. 1 may, as part of HSM server 206, migrate at least one of objects 220 from storage system 120 to repository 230 and/or restore or restore at least one of objects 220 from repository 230 to storage system 120.

Server-side web service module 110 may migrate a file from the endpoint system to a repository in any suitable manner. For example, server-side web service module 110 may refer to metadata received from endpoint system 202 (e.g., the last time a file was accessed and the size of the file) and the hierarchical storage management policy transmitted to endpoint system 202 (e.g., migrate all files that haven't been accessed within a week and that are larger than one megabyte).

Additionally or alternatively, server-side web service module 110 may restore a file from the repository to the endpoint system. As in the example above, server-side web service module 110 may draw on enumeration metadata and/or a hierarchical storage management policy to determine whether a file should be restored (e.g., server-side web service module 110 may restore a file to an endpoint system based on an HSM policy that a file accessed twice within the last week and under 50 megabytes should be restored).

In some embodiments, the systems and methods disclosed herein may select objects stored on the endpoint system via an HTTP browser interface. For example, server-side web service module 110 may access an HTTP browser interface exposed by endpoint system 202 for selecting some of objects 220 on endpoint system 202 in FIG. 2. In one example, this may allow an administrator creating hierarchical storage management policies for HSM server 206 to access an interface listing some of objects 220. The administrator may then select certain objects (such as volumes) for inclusion or exclusion in the hierarchical storage management system.

As detailed above, by utilizing an agent on an endpoint system to perform hierarchical storage management functions (such as object enumeration and hierarchical-storage-management-policy enactment) and by transmitting information pertaining to hierarchical storage management tasks via a web service, the systems and methods described herein may enable hierarchical storage management systems to include endpoints that would otherwise be incompatible with conventional hierarchical storage management servers.

Figure 5:
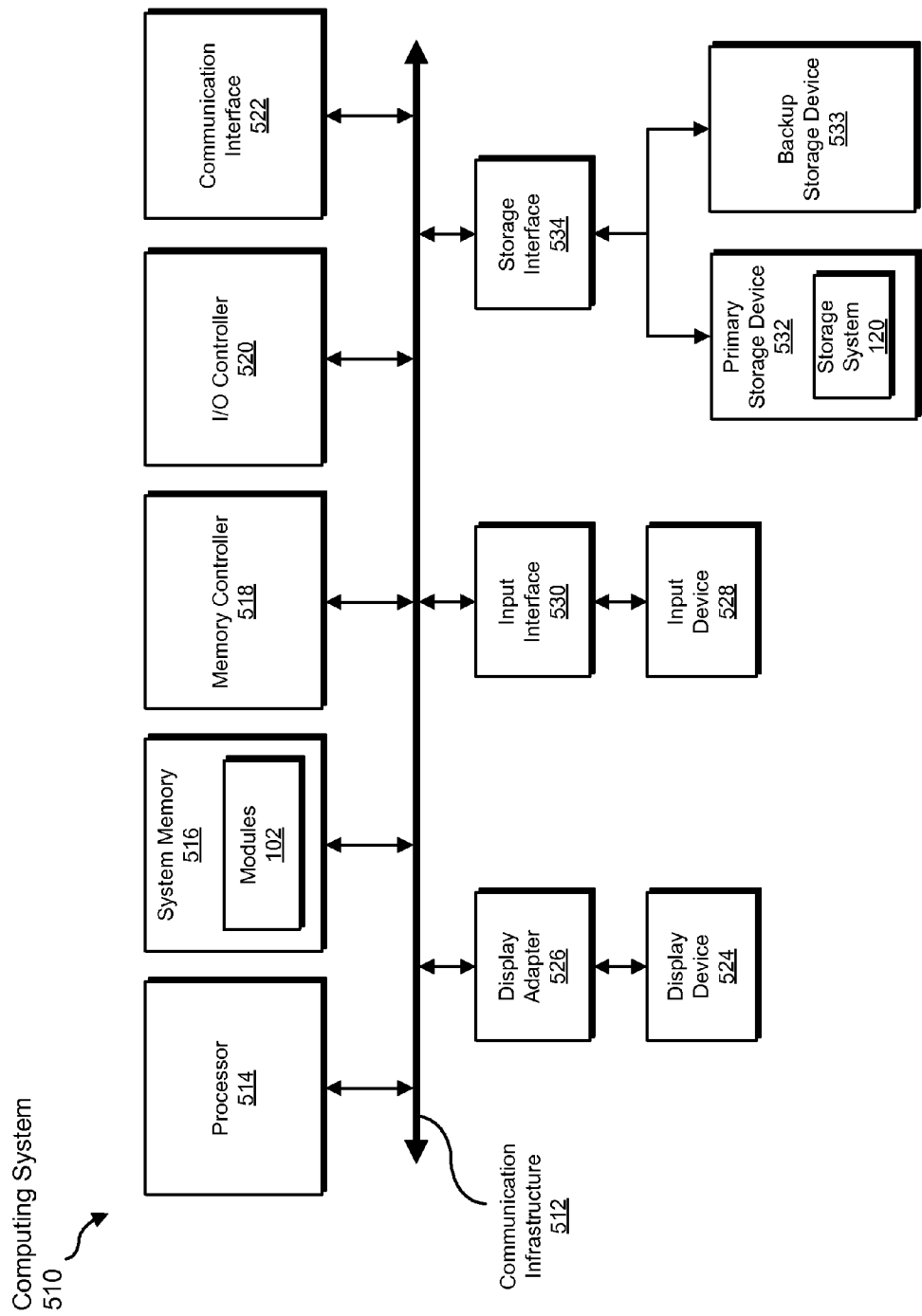
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the enumerating, creating, gathering, classifying, ranking, prioritizing, transmitting, receiving, enacting, migrating, restoring, exposing, and/or selecting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as enumerating, creating, gathering, classifying, ranking, prioritizing, transmitting, receiving, enacting, migrating, restoring, exposing, and/or selecting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the enumerating, creating, gathering, classifying, ranking, prioritizing, transmitting, receiving, enacting, migrating, restoring, exposing, and/or selecting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the enumerating, creating, gathering, classifying, ranking, prioritizing, transmitting, receiving, enacting, migrating, restoring, exposing, and/or selecting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the enumerating, creating, gathering, classifying, ranking, prioritizing, transmitting, receiving, enacting, migrating, restoring, exposing, and/or selecting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems. In some examples, primary storage device 532 may include storage system 120 from FIG. 1.

In certain embodiments, storage devices 532 and 533 may be used, for example, to perform and/or be a means for performing, either alone or in combination with other elements, one or more of the enumerating, creating, gathering, classifying, ranking, prioritizing, transmitting, receiving, enacting, migrating, restoring, exposing, and/or selecting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
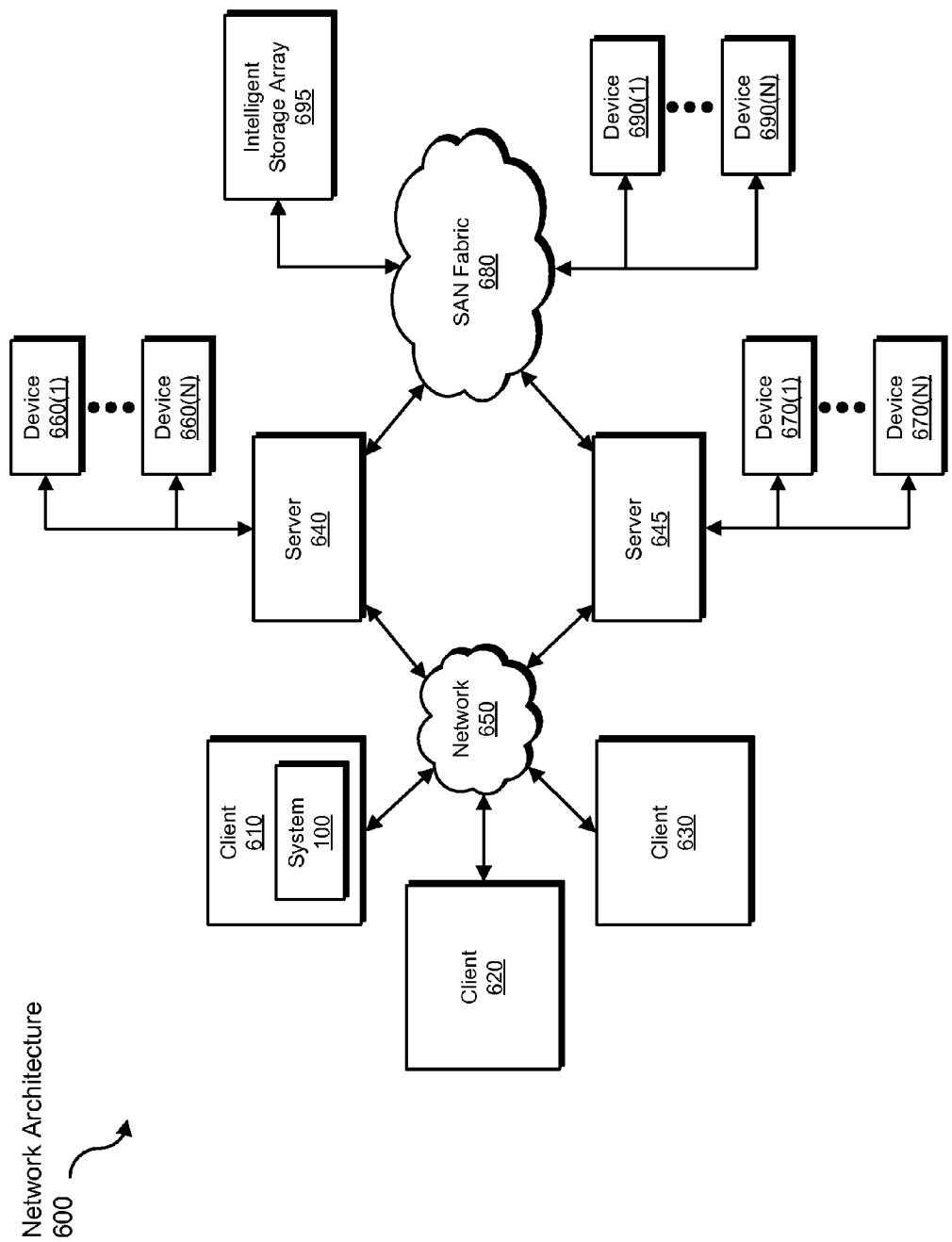
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client systems 610, 620, and/or 630 and/or servers 640 and/or 645 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that storage devices 690(1)-(N) and intelligent storage array 695 appear as locally attached devices to client systems 610, 620, and 630. As with storage devices 660(1)-(N) and storage devices 670 (1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the enumerating, creating, gathering, classifying, ranking, prioritizing, transmitting, receiving, enacting, migrating, restoring, exposing, and/or selecting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for projecting hierarchical storage management functions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a storage device on an endpoint system into a hierarchical storage management device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for projecting hierarchical storage management functions, at least a portion of the method being performed by an endpoint system comprising at least one processor, the method comprising:
   identifying a hierarchical storage management policy from a hierarchical storage management server, the hierarchical storage management policy comprising a decision-making scheme relating to the disposition of objects stored on the endpoint system;
   determining, using an agent installed on the endpoint system, that the hierarchical storage management server lacks the native ability to communicate information pertaining to hierarchical storage management tasks associated with the hierarchical storage management policy to the endpoint system, the hierarchical storage management server lacking the native ability due to employing a file system that is incompatible with a file system employed by the endpoint system;
   facilitating interoperability between the hierarchical storage management server and the endpoint system to allow the endpoint system to enact the hierarchical storage management tasks by:
      enumerating, using the agent installed on the endpoint system, the objects stored on the endpoint system;
      formatting, using an endpoint web service module installed on the endpoint system, information relating to the enumeration of the objects stored on the endpoint system into a machine-parsable text and inserting the machine-parsable text into an open protocol message that is natively understood by the hierarchical storage management server;

transmitting, via the endpoint web service module, the open protocol message to the hierarchical storage management server;

receiving, via the endpoint web service module, an additional open protocol message that is natively understood by the endpoint system, the additional open protocol message including the hierarchical storage management tasks, wherein the hierarchical storage management tasks have been formatted, by a server-side web service module, into additional machine-parsable text and inserted into the additional open protocol message;

enacting the hierarchical storage management tasks associated with the hierarchical storage management policy via the agent installed on the endpoint system.

2. The computer-implemented method of claim 1, wherein enumerating the objects stored on the endpoint system comprises creating at least one of:
 a list of the objects stored on the endpoint system;
 a count of the objects stored on the endpoint system;
 a catalogue of the objects stored on the endpoint system.

3. The computer-implemented method of claim 1, wherein enumerating the objects stored on the endpoint system comprises at least one of:
 gathering metadata related to the objects stored on the endpoint system;
 classifying the objects stored on the endpoint system;
 ranking the objects stored on the endpoint system.

4. The computer-implemented method of claim 3, wherein gathering the metadata related to the objects stored on the endpoint system comprises gathering at least one of:
 sizes of the objects stored on the endpoint system;
 creation times of the objects stored on the endpoint system;
 most recent read times of the objects stored on the endpoint system;
 most recent write times of the objects stored on the endpoint system;
 permissions associated with the objects stored on the endpoint system;
 ownerships of the objects stored on the endpoint system;
 numbers of links to the objects stored on the endpoint system;
 regular attributes of the objects stored on the endpoint system;
 extended attributes of the objects stored on the endpoint system;
 forks of the objects stored on the endpoint system.

5. The computer-implemented method of claim 3, wherein ranking the objects stored on the endpoint system comprises at least one of:
 prioritizing the objects stored on the endpoint system for migration to a repository;
 prioritizing the objects stored on the endpoint system for keeping present on the endpoint system;
 prioritizing the objects stored on the endpoint system for recovery after a failure on the endpoint system.

6. The computer-implemented method of claim 1, wherein the open protocol message and the additional open protocol message each comprise an XML message that follows a Simple Object Access Protocol.

7. The computer-implemented method of claim 1, wherein the endpoint web service module transmits the open protocol message via HTTP.

8. The computer-implemented method of claim 1, wherein enacting the hierarchical storage management tasks associated with the hierarchical storage management policy via the agent installed on the endpoint system comprises at least one of:
 migrating at least one file from the endpoint system to a repository;
 restoring at least one file from the repository to the endpoint system.

9. The computer-implemented method of claim 8, wherein migrating the file from the endpoint system to the repository comprises creating a stub for the file via the agent installed on the endpoint system.

10. The computer-implemented method of claim 1, wherein transmitting the open protocol message to the hierarchical storage management server comprises exposing to the hierarchical storage management server, via the agent installed on the endpoint system, an HTTP browser interface for selecting the objects stored on the endpoint system.

11. A computer-implemented method for projecting hierarchical storage management functions, at least a portion of the method being performed by a hierarchical storage management server comprising at least one processor, the method comprising:
 identifying a hierarchical storage management policy from the hierarchical storage management server, the hierarchical storage management policy comprising a decision-making scheme relating to the disposition of objects stored on an endpoint system of a hierarchical storage management system;
 determining that the endpoint system lacks the native ability to communicate information pertaining to hierarchical storage management tasks associated with the hierarchical storage management policy to the hierarchical storage management server, the endpoint system lacking the native ability due to employing a file system that is incompatible with a file system employed by the hierarchical storage management server;
 facilitating interoperability between the hierarchical storage management server and the endpoint system to allow the endpoint system to communicate information pertaining to the hierarchical storage management tasks by:
  receiving from a client-side web service module installed on the endpoint system, via a server-side web service module installed on the hierarchical storage management server, an open protocol message that is natively understood by the hierarchical storage management server, the open protocol message comprising information relating to an enumeration of objects stored on the endpoint system that are capable of being manipulated by the hierarchical storage management tasks, wherein the information has been formatted, by the client-side web service module, into machine-parsable text and inserted into the open protocol message;
  formatting, using the server-side web service module, the hierarchical storage management tasks associated with the hierarchical storage management policy into additional machine-parsable text and inserting the additional machine-parsable text into an additional open protocol message that is natively understood by the endpoint system;
  transmitting, via the server-side web service module, the additional open protocol message to the endpoint system.

12. The computer-implemented method of claim 11, wherein receiving the open protocol message comprises receiving at least one of:
- a list of the objects stored on the endpoint system;
- a count of the objects stored on the endpoint system;
- a catalogue of the objects stored on the endpoint system.

13. The computer-implemented method of claim 11, wherein receiving the open protocol message comprises receiving at least one of:
- metadata related to the objects stored on the endpoint system;
- a classification of the objects stored on the endpoint system;
- a ranking of the objects stored on the endpoint system.

14. The computer-implemented method of claim 13, wherein receiving the metadata related to the objects stored on the endpoint system comprises receiving at least one of:
- sizes of the objects stored on the endpoint system;
- creation times of the objects stored on the endpoint system;
- most recent read times of the objects stored on the endpoint system;
- most recent write times of the objects stored on the endpoint system;
- permissions associated with the objects stored on the endpoint system;
- ownerships of the objects stored on the endpoint system;
- numbers of links to the objects stored on the endpoint system;
- regular attributes of the objects stored on the endpoint system;
- extended attributes of the objects stored on the endpoint system;
- forks of the objects stored on the endpoint system.

15. The computer-implemented method of claim 13, wherein receiving the ranking of the objects stored on the endpoint system comprises receiving at least one of:
- a prioritization for migrating the objects stored on the endpoint system to a repository;
- a prioritization for keeping the objects stored on the endpoint system present on the endpoint system;
- a prioritization for recovering the objects stored on the endpoint system after a failure on the endpoint system.

16. The computer-implemented method of claim 11, wherein the open protocol message and the additional open protocol message each comprise an XML message that follows a Simple Object Access Protocol.

17. The computer-implemented method of claim 11, wherein the server-side web service module transmits the additional open protocol message via HTTP.

18. The computer-implemented method of claim 11, further comprising at least one of:
- migrating at least one file from the endpoint system to a repository;
- restoring at least one file from the repository to the endpoint system.

19. The computer-implemented method of claim 11, wherein receiving the open protocol message comprises receiving the open protocol message via an HTTP browser interface.

20. An endpoint system capable of facilitating communication of information pertaining to hierarchical storage management tasks associated with a hierarchical storage management policy, the endpoint system comprising:
- an agent programmed to identify a hierarchical storage management server that lacks the native ability to communicate the information pertaining to the hierarchical storage management tasks associated with the hierarchical storage management policy, the hierarchical storage management policy comprising a decision making scheme relating to the disposition of objects stored on the endpoint system, to the endpoint system due to employing a file system that is incompatible with a file system employed by the endpoint system, wherein the agent is programmed to facilitate interoperability between the endpoint system and the hierarchical storage management server to allow the endpoint system to enact the hierarchical storage management tasks by:
  - enumerating, using an enumeration module, the objects stored on the endpoint system;
  - formatting, using an endpoint web service module installed on the endpoint system, information relating to the enumeration of the objects stored on the endpoint system into a machine-parsable text and inserting the machine-parsable text into an open protocol message that is natively understood by the hierarchical storage management server;
  - transmitting, via the endpoint web service module, the open protocol message to the hierarchical storage management server;
  - receiving, via the endpoint web service module, an additional open protocol message that is natively understood by the endpoint system, the additional open protocol message including the hierarchical storage management tasks, wherein the hierarchical storage management tasks have been formatted, by a server-side web service module, into additional machine-parsable text and inserted into the additional open protocol message;
- enacting, using an enactment module, the hierarchical storage management tasks associated with the hierarchical storage management policy via the agent installed on the endpoint system;
- at least one processor configured to execute the enumeration module, the endpoint web service module, and the enactment module.

* * * * *